United States Patent [19]

Herbst et al.

[11] 3,950,288

[45] Apr. 13, 1976

[54] PIGMENT COMPOSITIONS IN PASTE OR POWDER FORM FOR USE IN PRINTING INKS

[75] Inventors: Willy Herbst, Hofheim, Taunus; Albert Rudolphy, Wiesbaden; Hans Peter Simson, Mainz, all of Germany

[73] Assignee: Hoechst Aktiengesellschaft, Frankfurt am Main, Germany

[22] Filed: Oct. 29, 1974

[21] Appl. No.: 519,031

[30] Foreign Application Priority Data

Oct. 30, 1973  Germany............................ 2354225

[52] U.S. Cl........... 260/22 CB; 106/32; 106/308 M; 260/23 CP; 260/33.6 R; 260/40 R; 260/DIG. 38

[51] Int. Cl.² C09D 3/66; C09D 11/10; C09D 17/00

[58] Field of Search....... 106/32, 308 M; 260/22 CB

[56] References Cited

UNITED STATES PATENTS

| | | | |
|---|---|---|---|
| 3,389,015 | 6/1968 | Scala et al. | 260/22 CB |
| 3,477,975 | 11/1969 | Concannon | 260/22 A |
| 3,600,346 | 8/1971 | Spatola | 260/22 R |
| 3,615,754 | 10/1971 | Gotshall | 106/308 M |
| 3,759,732 | 9/1973 | Twist et al. | 106/308 M |
| 3,786,008 | 1/1974 | Piiroya et al. | 260/22 CB |

OTHER PUBLICATIONS

Apps, Printing Ink Technology, Leonard Hill Limited, London, 1958, pp. 60–64.
Patton, Alkyd Resin Technology, Interscience Publishers, New York, N.Y., 1962, p. 175.
Larsen, Industrial Printing Inks, Reinhold Publishing Corp., New York, N.Y., 1962, pp. 90, 96, 97, 98, 120 & 121.

*Primary Examiner*—Ronald W. Griffin
*Attorney, Agent, or Firm*—Henry W. Koster

[57] ABSTRACT

A pigment compositon in powder or paste form, which comprises, as a preparation agent, a mixture consisting of (a) an alkyd resin having a high oil content, (b) a hydrocarbon resin, (c) a mineral oil boiling between 240° and 320°C, the ratio of component (a) to component (b) being from 1 : 1 to 1 : 1.5 and that of components (a)+(b) to component (c) varying from 4 : 1 to 0.7 : 1. This pigment composition is used in printing inks.

7 Claims, No Drawings

PIGMENT COMPOSITIONS IN PASTE OR POWDER FORM FOR USE IN PRINTING INKS

The present invention relates to pigment compositions to be used in the form of pastes or powders for printing purposes.

It is known to prepare most of the pigments to be used in printing ink systems in an aqueous medium, then dry and grind them. The particles of these pigments usually tend to agglomerate more or less. Such agglomerations have to be comminuted as far as possible by dispersing them during the preparation of the printing inks since, otherwise, they give rise not only to a reduced tinctorial strength but also to difficulties in the printing process using the corresponding dyes. To improve the dispersibility of the pigments, they are treated with surface-active substances, for example certain amines, natural resins and derivatives thereof, such as rosin and metal salts thereof, as well as certain synthetic resins, for example rosin resins modified by phenol and/or maleic acid. It is also known to use natural oils or mineral oils for making pigment compositions.

Although those pigment compositions in powder form, in many cases, have the advantage of less preparation agent being incorporated in the printing ink, these preparation agents often raise difficulties in the printing process, for example in the offset printing method wherein pigments treated with amines disturb the water-ink balance, which is the basis for this printing method. Resins are, above all, used as preparation agents whenever highly transparent pigments, i.e. pigments having a high specific surface, are to be prepared. Even when used in concentrations corresponding to practical work highly transparent pigments provide printing inks having a relatively high viscosity which is generally still increased by the action of the resin used as a preparation agent. The various pigment compositions mentioned exhibit a gradually differing dispersibility which, in many cases, does not meet the increasing standards. Thus, manufacturers of printing inks increasingly employ modern-type dispersing devices which, though operating economically at a higher throughput, comminute the agglomerations less inensively, thus reducing the dispersibility of the pigment.

In the case of pigments which, owing to their chemical constitution, have an especially strong tendancy to agglomerate, for example polar alkali blue pigments, the well-known method of flushing the aqueous pigment press cake with binding agents, which vary according to the intended use, is frequently used.

As a consequence of the steadily increasing demands on modern printing inks, it is imperative that the binding agents used in the flush pastes are compatible with the various components of the printing ink. This is the more necessary as the content of binding agent in flush pastes, which contain pigments with a high specific surface, ranges from 50 to 70%. Flush pastes of that type used for the incorporation of pigments in varnishes and printing inks may, on the one hand, adversely affect the rheological properties thereof and, on the other hand, as is frequent, the printing properties, in particular the drying behavior, for example in heat-set inks. This is the reason why the flush pastes have to contain special systems of binding agents for particular pigments which have to meet the requirements of various fields of application.

This invention provides pigment compositions in paste or powder form for use in printing inks which contain, as preparation agent, a mixture consisting of a. an alkyd resin having a high oil content of 70 – 80%, preferably 75 – 77%, the oils of which are mixtures of drying, semi-drying and non-drying oils, the carboxylic acids of which consist of mixtures of iso- and orthophthalic acids and of small portions of $\alpha$, $\beta$-unsaturated dicarboxylic acids and which contain, as polyalcohols, mixtures of glycerol and pentaerythritol, b. a hydrocarbon resin having an average molecular weight of 600 – 1700, preferably a mixture of two hydrocarbon resins, the one component having an average molecular weight of 600 – 1100, a melting point ranging from 80° to 100° C, a viscosity ranging from 12 to 25 cP in a 50% toluene solution at 20° C according to Ubbelohde, and the other component having an average molecular weight of 1400–1700, a melting point ranging from 110° to 130° C and a viscosity ranging from 25 to 45 cP in a 50% toluene solution, and the bromine numbers of which range from 10 to 200, and c. a mineral oil having a boiling range of from 240° to 320° C, the ratio of component (a) to component (b) varying from 1 : 1 to 1 : 1.5, preferably it is 1 : 1.25, and the ratio of the components (a) + (b) to component (c) ranging from 4 : 1 to 0.7 : 1, preferably from 2.3 : 1 to 0.8 : 1.

As alkyd resins having a high oil content as mentioned sub (a), there are especially mentioned those in which the oils are mixtures of 46 – 48% by weight of drying oils, 46 – 48% by weight of semi-drying oils and 4 –8% by weight of nondrying oils, the carboxylic acids of which consist of mixtures of 45 – 55% by weight of isophthalic acid, 45 – 55% by weight of orthophthalic acid and 0.5 – 1.5% by weight of an $\alpha$, $\beta$-unsaturated dicarboxylic acid and which, as polyalcohols, contain mixtures of 55 – 65% by weight of glycerol and 35 – 45% by weight of pentaerythritol.

It has now been found that mixtures of the above-said resins and oils used within the cited narrow mixing ratio limits yield pigment compositions both in paste as in powder form which are distinguished by a very broad compatibility range. They may advantageously be used as well in predominantly chemically drying systems, such as in letterpress and lithographic inks, as in physically drying systems, such as in gravure inks. They are, of course, also suitable for systems which dry simultaneously in a physical and chemical manner, for example heat-set inks.

For the preparation of the compositions disclosed in the following examples the following aklyd resins and binding agents were used, the parts being always by weight.

Alkyd resin No. 1

This resin was prepared by heating 940 parts of linseed oil, 940 parts of soy bean oil, 120 parts of castor oil, 240 parts of isophthalic acid, 30 parts of fumaric acid, 200 parts of phthalic acid anhydride, 160 parts of glycerol and 24 parts of pentaerythritol. Characteristics: Acid number 5, viscosity 70 Poise (according to Ubbelohde at 20° C), oil content 76.4%.

Binding Agent A

310 Parts of this alkyd resin No. 1 were heated to 180° C with 300 parts of a mineral oil with a boiling range between 260° and 290° C. To this 195 Parts of a hydrocarbon resin polymerized in known manner from $C_9$-fractions were added. This hydrocarbon resin had an indene content of less than 20% of the polymerizable portions, a possible content of up to 15% of phenols as addition products, a melting point of 83° C (capillaries), a viscosity of 13 cP as a 50% solution in toluene and an average molecular weight of 900. Another 195 parts of a resin also obtained from $C_9$-fractions, which had an indene content of 25% of polymerisable portions, a melting point of 120° C, a viscosity of 36 cP as a 50% solution in toluene and an average molecular weight of 1600, were also added. The mixture was dissolved at 160° – 180° C and filtered. Characteristics: Solids content 70%, viscosity: 155 Poise, acid number 2.

Binding agent B

In 855 parts of a mineral oil with a boiling range between 260° to 290° C, 195 parts each of the two hydrocarbon resins used in binding agent A were dissolved at 180° – 200° C, and 300 parts of alkyd resin No. 1 were added. After 15 minutes at 150° C, the mixture was cooled and filtered. Characteristics: Solids content 45%, viscosity 2.3 Poise, acid number 1.2.

Binding agent C

310 Parts of alkyd resin No. 1 were heated to 250° C with 195 parts each of the hydrocarbon resins used in binding agents A and B and while cooling under reflux diluted with 300 parts of a mineral oil with a boiling range between 260° and 290° C, cooled and filtered. Characteristics: Viscosity 165 Poise, acid number 1.9, solids content 70%.

Alkyd resin No. 2

This resin was prepared by heating 470 parts of linseed oil, 470 parts of soy bean oil, 60 parts of castor oil, 233 parts of isophthalic acid, 13 parts of fumaric acid, 80 parts of glycerol and 47 parts of pentaerythritol. The resin had the acid number 4, a viscosity of 150 Poise (according to Ubbelohde at 20° C) and an oil content of 76.5%.

Binding agent D

The alkyd resin No. 2 was processed into a varnish in the same manner and under the same quantity conditions as binding agent A, except that, instead of the hydrocarbon resin obtained from $C_9$-fractions, 390 parts of a polymer resin obtained in known manner by polymerization of cyclopentadiene and/or substituted cyclopentadienes under pressure were used. This polymer resin had a melting point of 90° C, a viscosity (as a 50% solution in toluene) of 14 cP, a bromine number of 135 and an average molecular weight of 700. Characteristics of the varnish: Solids content 70%, viscosity 180 Poise and acid number 2.

Binding agent E

In the same manner as disclosed for binding agent B and using the same amounts, alkyd resin No. 2 was used to prepare a binding agent by replacing the resin used for binding agent B by a hydrocarbon resin obtained from $C_5$-fractions, which had a melting point of 70° C, a viscosity (as a 50% solution in toluene) of 9 cP, a bromine number of 35 and an average molecular weight of 600. Characteristics of the varnish: Solids content 45%, viscosity 1.4 Poise and acid number 1.2.

As pigments to be incorporated with compositions of this type, any organic and inorganic pigment is generally suitable. Particular advantages are gained with pigments which result in especially hard particles on drying and/or which are difficult to disperse in varnishes. This applies particularly to strongly polar pigments, among which pigments having sulfonic acid groups, such as the alkali blue pigments, laked pigments and others are typical examples. Pigments usually tend to agglomerate extensively if they are prepared with a particularly fine crystalline structure, i.e. if their surface energy is extremely high. Pigments of this very type are, in many cases, used in the field of printing inks, above all in multicolor printing, especially owing to their high transparency. To obtain printing inks with a high transparency, pigments of a high specific surface are therefore, in many cases, used in the form of flush pastes in printing inks, which normally, that is to say if requirements for transparency are not high, are not regarded as difficult to disperse and/or hard to grind. These highly transparent pigments may also be used to produce the compositions of the invention which offer advantages in a variety of application media.

The concentration of pigments incorporated in the pigment compositions of the invention may generally vary greatly, normally from 25 to 95% by weight and preferably from 35 to 60% by weight. Accordingly, the percentage of preparation agent to be used according to the invention ranges from 5 to 75% by weight, preferably from 40 to 65% by weight.

The pigment composition is prepared by adding the preparation agent during the pigment manufacture or by flushing the aqueous pigment press cake. Depending on its utility, the composition may be obtained in paste or powder form according to the choice of the pigment content and the preparation method.

In addition to a very broad range of compatibility of the preparation agent of the invention, which almost covers the whole field of printing inks, with the corresponding systems of binding agents and printing inks suitable for various printing methods and in addition to the easy dispersibility of the pigment compositions of the invention in these binding agents, the compositions of the invention have the further advantage of being producible within wide limits both as powders and as pastes.

The following Examples illustrate the invention, the parts and percentages being by weight unless stated otherwise.

EXAMPLE 1:

240 Parts of Pigment Blue 18 (C.I. No. 42 770) in form of an aqueous press cake (29% pigment content) were kneaded with 232 parts of binding agent B for about 1 hour in a 2-liter laboratory-scale kneader provided with sigma-shaped blades. During this operation, about 75% of the water present separated and were removed by tilting the kneader. The remaining water was withdrawn from the oily paste in vacuo. The water-free oily paste was then mixed with 128 parts of a mineral oil (boiling range: 250° – 320°C). The so-obtained 40% blue flush paste was incorporated in printing inks which had a tinctorial strength that was by about 30% higher than those prepared with dried and ground pigment. In spite of the comparatively high pigment content, this flush paste had an unusually low viscosity. This paste could be mixed in simple manner with black pastes and produced an excellent brightening effect.

Owing to a very comprehensive compatibility of the binding agent used, the application field of this paste ranged from heat-set inks via sheet-fed offset and letterpress to gravure printing inks on a toluene basis. Incorporated in all these binding agent systems as well as in a number of further systems on a different basis, for example in screen printing inks or in the manufacture of office supply, these pastes can be used with advantage.

EXAMPLE 2:

200 Parts of Pigment Yellow 13 (C.I. No. 21 100) in the form of an aqueous press cake (25% pigment content) were kneaded with 137.7 parts of binding agent C and 12.3 parts of a conventional cationic dispersing agent for about 30 minutes in a 2-liter laboratory-scale kneader provided with sigma-shaped blades. During this operation, about 93% of the water present separated and were removed by tilting the kneader. The remaining water was eliminated from the oily paste in vacuo. The water-free oily paste was then diluted with 30.3 parts of the said binding agent, 2.7 parts of a cationic dispersing agent and 97 parts of a mineral oil, boiling range from 260 to 290°C. The so-obtained 40% yellow flush paste yielded printing inks of high tinctorial strength, excellent brilliancy and very good rheological properties. Above all, the said properties are better than those of dyes which have been prepared in the usual manner with dried and ground pigment.

EXAMPLE 3:

250 Parts of Pigment Red 53 : 1 (C.I. No. 15 585 : 1) in the form of an aqueous press cake (33% pigment content) were kneaded for about 15 minutes with 160 parts of binding agent C in a 2-liter laboratory-scale kneader provided with sigma-shaped blades. During this operation, about 85% of the water present separated and were removed by tilting the kneader. The remaining water was eliminated from the oily paste in vacuo. The water-free oily paste was then diluted with 90 parts of a mineral oil (boiling range: 260° - 290°C). The so-obtained 50% red flush paste yielded printing inks with a tinctorial strength which was by 10% higher and with rheological properties by far better than those of printing inks prepared in the usual manner with dried and ground pigment.

EXAMPLE 4:

240 Parts of Pigment Blue 18 (C.I. No. 42 770) in the form of an aqueous press cake (29% pigment content) were kneaded with 232 parts of binding agent D in the manner disclosed in Example 1. The further treatment and the addition of 128 parts of mineral oil were also carried out as in Example 1. The so-obtained flush paste was distingued by a high tinctorial strength, an excellent brightening effect when combined with black pastes and an unusually low viscosity of the pastes.

EXAMPLE 5:

100 Parts of Pigment Blue 18 (C.I. No. 42 770) in the form of an aqueous press cake (33% pigment content) were dissolved while stirring at 95° C with 46 parts of sodium hydroxide solution (0f 33% strength) in 600 parts of water. 100 Parts of binding agent B, 3.5 parts of oxethylated nonyl-phenol with 15 mols of ethylene oxide and 25 parts of water were made into an emulsion which was dispersed while intensively stirring in the pigment solution of 95° C. At the same time, 21 parts of 98% sulfuric acid in 1000 parts of water were heated to 95° C in a stirrer vessel. By pouring the alkaline pigment solution containing the binding agent into the hot sulfuric acid, the pigment enveloped with the binding agent was precipitated, while stirring was continued permanently. The suspension was cooled, suction-filtered, washed, dried and finely ground. The 50% blue pigment composition obtained was excellently suitable for the production of printing inks. The composition was substantially easier to disperse and its tinctorial strength by about 30% higher than that of the untreated pigment. In comparison with untreated powder pigments, the rheological properties of the printing inks prepared with these compositions are also substantially improved, the concentration of pigment being the same. The coloristic properties of the easily dispersible pulverulent pigment compositions correspond largely to those of the flush pastes at the same pigment concentration.

When binding agent B was replaced by binding agent E, the powder compositions obtained had similar good properties.

EXAMPLE 6:

100 Parts of Pigment Blue 18 (C.I. No. 42 770) in the form of an aqueous press cake (33% pigment content) were dissolved while stirring at 95° C with 46 parts of sodium hydroxide solution (of 33% strength) in 600 parts of water. 25 Parts of alkyd resin No. 2, 0.9 part of oxethylated nonylphenol with 15 mols of ethylene oxide and 10 parts of water were made into an emulsion which was dispersed while intensively stirring in a pigment solution of 95° C. At the same time, 21 parts of 98% sulfuric acid in 1000 parts of water were heated to 95° C in a stirrer vessel. The further treatment was made as in Example 5. The so-obtained blue pigment composition was also substantially easier to disperse than the corresponding untreated pigment, its tinctorial strength was substantially higher and its printing properties were substantially better. Moreover, the rheological properties of the thus-pigmented inks were improved.

EXAMPLE 7:

100 Parts of Pigment Yellow 83 as an aqueous suspension (5% pigment content) were intensively stirred with an emulsion of 100 parts of binding agent B, 3.5 parts of an oxethylated nonylphenol with 15 mols of ethylene oxide and 400 parts of water for 10 minutes in a dissolver. The pigment enveloped with the binding agent was suction-filtered, washed, dried and finely ground. In comparison with a known corresponding untreated powder, this pigment composition, too, offered substantial technological advantages, some of them having an increased tinctorial strength and, especially, a higher brilliancy in prints.

We claim:

1. A pigment composition in powder or paste form, which consists essentially of pigment and, as a preparation agent, a mixture consisting of
   a. an alkyd resin having a high oil content of 70 to 80% prepared from mixtures of drying, semi-drying and non-drying oils, mixtures of iso- and ortho-phthalic acids and small portions of an $\alpha$, $\beta$-ethylenically unsaturated dicarboxylic acid and mixtures of glycerol and pentaerythritol,
   b. a hydrocarbon resin having an average molecular weight of 600 to 1700 and bromine number between 10 and 200, and c. a mineral oil boiling between 240° and 320° C, the ratio of component (a) to component (b) being from 1 : 1 to 1 : 1.5 and that of components (a)+(b) to component (c) varying from 4 : 1 to 0.7 : 1.

2. A pigment composition as claimed in claim 1, wherein the preparation agent contains alkyd resins of high oil content, in which the oils are mixtures of 46 to 48% by weight of drying oils, 46 to 48% by weight of semi-drying oils and 4 to 8% by weight of non drying oils, the carboxylic acids consist of mixtures of 45 – 55% by weight of isophthalic acid, 45 – 55% by weight of orthophthalic acid and 0.5 – 1.5% by weight of an α,β-ethylenically unsaturated dicarboxylic acid and which, as polyalcohols, contain mixtures of 55 – 65% by weight of glycerol and 35 – 45% by weight of pentaerythritol.

3. A composition as claimed in claim 1, wherein component (b) is a mixture of two hydrocarbon resins, the one component having an average molecular weight of from 600 to 1100, a melting point of 80° to 100° C, a viscosity from 12 to 25 cP in a 50% solution in toluene at 20° C according to Ubbelohde, and the other component having an average molecular weight of from 1400 to 1700, a melting point of from 110° to 130° C and a viscosity of from 25 to 45 cP as a 50% solution in toluene at 20° C.

4. A composition as claimed in claim 1, which consists of 95 to 25% by weight of pigment and 5 to 75% by weight of preparation agent.

5. A composition as claimed in claim 1, which consists of 35 to 60% by weight of pigment and 40 to 65% by weight of preparation agent.

6. A composition as claimed in claim 1, wherein the pigment is an alkali blue pigment or a laked pigment.

7. A composition as claimed in claim 1, wherein the pigment is C.I. Pigment Blue 18.

* * * * *